Nov. 1, 1960 P. F. SMITH 2,958,851

DATA PROCESSING SYSTEM WITH SYNCHRONOUS AND ASYNCHRONOUS STORAGE DEVICES

Filed April 24, 1957 3 Sheets-Sheet 1

INVENTOR.
PERRIN F. SMITH

BY Richard E Cummins

ATTORNEY

United States Patent Office 2,958,851

Patented Nov. 1, 1960

2,958,851

DATA PROCESSING SYSTEM WITH SYNCHRONOUS AND ASYNCHRONOUS STORAGE DEVICES

Perrin F. Smith, Saratoga, Calif., assignor to International Business Machines Corporation, New York, N.Y., a corporation of New York Filed Apr. 24, 1957, Ser. No. 654,794

7 Claims. (Cl. 340—172.5)

This invention relates in general to systems for processing data electronically and in particular to an electronic data processing system in which an asynchronous data processing unit is operated in timed relation with and under the control of a synchronous data processing unit.

In any data processing system provision must necessarily be made for storing the data to be processed in a permanent or semi-permanent form so that it is readily accessible when needed. Some systems employ magnetic storage devices wherein the data is stored in the form of magnetized areas on a disc, drum or tape, the areas defining bits of information arranged to form coded characters or words which are translatable into pulsed electrical signals by moving the magnetized areas relative to a magnetic transducer at some predetermined constant speed. These storage devices may be referred to as synchronous devices because they involve relative motion of members of appreciable mass and are, of course, well known in the art.

Where the quantity of data to be handled becomes very large, magnetic storage becomes relatively expensive and requires considerable space. To overcome this, some data processing systems store the data to be processed on a record member in the form of marks or indicia that may be translated into pulsed electrical signals by scanning a line of these marks by electronic means, such as a cathode ray tube, flying spot scanner or an image dissector. Such devices may be referred to as asynchronous storage devices because they do not involve relative motion of members of appreciable mass, and are also known in the art.

The situation often arises where it is desirable to exchange information between two processing units, one of which has an asynchronous storage device and the other a synchronous storage device, or to compare the information stored in the respective units without the use of a buffer storage. In situations such as this it is necessary that corresponding bit positions of the information stored in each device occur at substantially the exact, same time during a read-out operation. In other words, the informational signals representing the information being read out from the storage devices simultaneously must be in phase.

In accordance with the present invention a system is provided whereby information stored in an asynchronous storage device may be transferred to a synchronous storage device or, alternatively, compared with information stored in the synchronous device. If a comparing operation is desired, the system comprises generally means for generating clock pulse trains from each device which are in timed phase relationship with their respective informational signals, means for obtaining a voltage in accordance with the relative phase difference between the clock trains for controlling the speed at which information is obtained from the asynchronous device to cause this speed to correspond to the speed at which information is obtained from the synchronous device, and means for comparing the informational signals on a bit-by-bit basis.

If a transfer operation is desired, the system comprises generally means for producing a first clock pulse train having a predetermined frequency, means for producing a second clock pulse train in timed phased relationship with the informational signal being obtained from the asynchronous device, means for obtaining a voltage in accordance with the phase difference between the two generated clock pulse trains to control the speed at which the informational signal is produced by the asynchronous device, and means responsive to said informational signal for writing into the storage of the synchronous device the information represented by the informational signal.

It is therefore an object of the present invention to provide a system for comparing information stored in a synchronous device with information stored in an asynchronous storage device.

Another object of the present invention is to provide a system for transferring information stored in an asynchronous device to a synchronous device.

A further object of the present invention is to provide a system having a synchronous storage device and an asynchronous storage device which cooperate to process data.

A still further object of the present invention is to provide a system having a magnetic storage device and a photoelectric storage device which is operated in timed relationship with and under the control of the magnetic storage device.

Other objects of the invention will be pointed out in the following description and claims and illustrated in the accompanying drawings, which disclose, by way of example, the principle of the invention and the best mode which has been contemplated of applying that principle.

Figure 1:
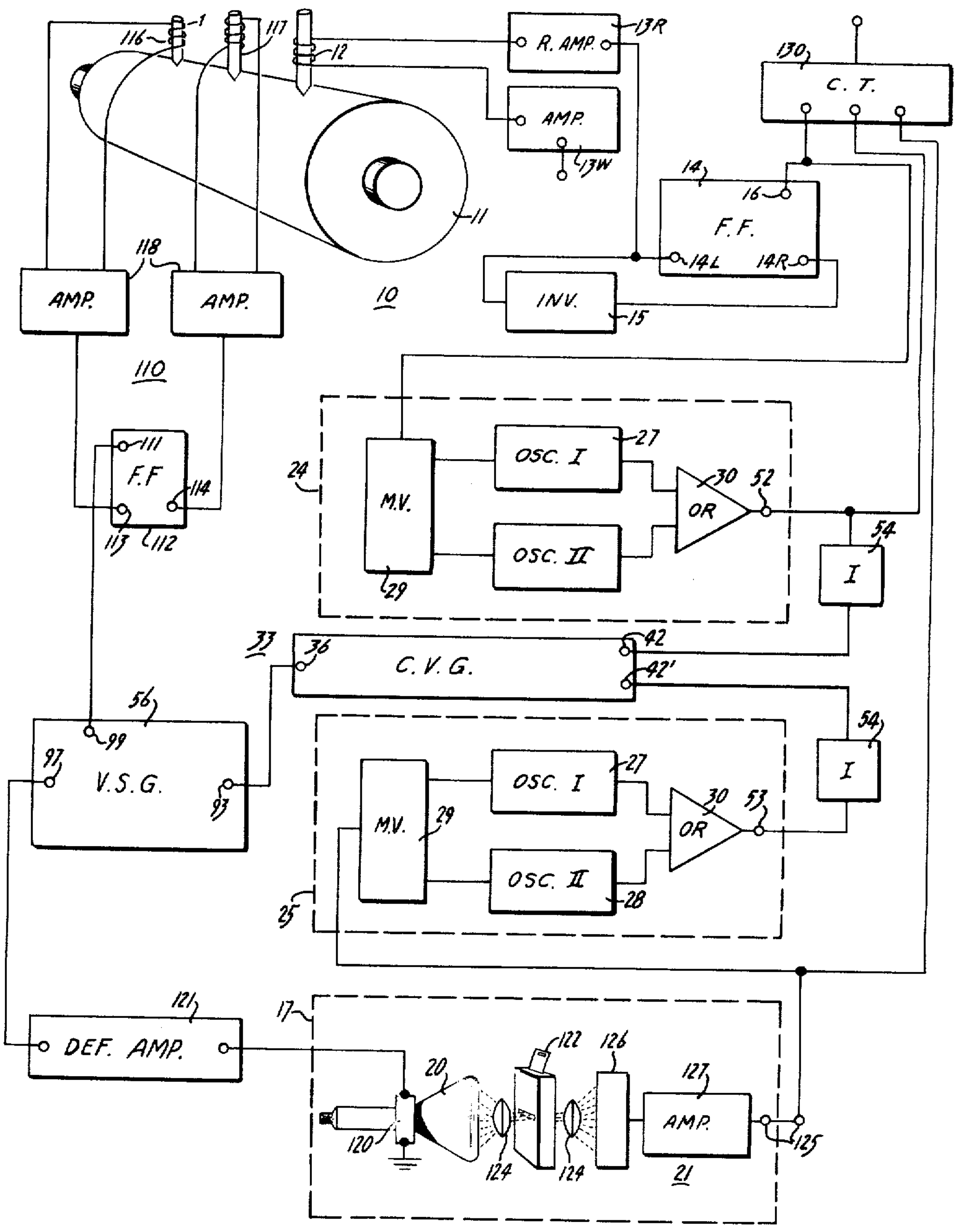
Fig. 1 is a diagrammatic view of a data processing system embodying the present invention.

Referring to the drawings and particularly to Fig. 1, the system shown therein comprises generally a synchronous storage device 10 represented diagrammatically by a rotatable magnetic drum 11 and a transducer 12. In storage devices of the type represented generally by device 10 the surface of the record member, in this instance the drum 11, is provided with a number of closely spaced, relatively narrow recording tracks each of which is capable of storing bits of binarily coded information in the form of magnetized areas. It may be assumed, for purposes of explanation, that one track is capable of storing 700 bits of information and that suitable means are provided for positioning the magnetic transducer 12 in reading and writing relationship with a preselected track. Transducer 12 is connected to the output of a write amplifier 13W for writing information onto drum 11 or, alternatively, to an input terminal of a read amplifier 13R for amplifying signals read from drum 11. The output of the amplifier 13R is connected directly to one input terminal 14L of a suitable flip-flop circuit 14 and indirectly through an inverter 15 to the other input terminal 14R of flip-flop 14. The output terminal 16 of flip-flop circuit 14 provides an informational signal representative of the information stored by drum 11.

Synchronous device 10, while being shown as a magnetic drum and transducer, may be any of the synchronous storage devices known in the art. Preferably, device 10 is of the type disclosed in "IBM Journal of Research and Development," volume 1, number 1, January 1957, on pages 62 through 75.

The system also includes an asynchronous storage device 17 which, as shown, is of the photoelectric type. In storage devices such as the one illustrated, information may be stored on a film strip or like member in the form of marks or indicia which are translatable into electrical signals by some suitable photo-sensing arrangement. As shown, the electron beam of a cathode ray tube 20 sweeps across the face of the cathode ray tube to generate a spot of light which is imaged on the film to sweep across a row of coded marks (shown in detail in Fig. 5) and excites a suitable photosensitive device represented by blocks 21 so that the marks are translated into an informational signal corresponding to the stored information.

Each device 10 and 17 is further provided with similar clock pulse generators 24 and 25 for generating clock pulses under the control of the informational signals and in timed relationship therewith. Pulse generators 24 and 25 are of the type disclosed in detail in U.S. 2,864,078, and hence only one will be summarily described here. Pulse generator 24 comprises a pair of oscillators 27 and 28 having identical frequencies matched to the speed of the record member or drum 11, and a multivibrator 29 (or flip-flop) which functions to turn one oscillator on and the other off in response to a change in significance of adjacent bits of the informational signal. By combining the output from each oscillator in a logical "or" gate 30, a clock pulse train is obtained whose pulse rate corresponds to the rate at which information is being obtained from the unit 10. Similarly, pulse generator 25 provides a clock pulse train which corresponds to the rate at which information is being obtained from the asynchronous device 17.

The system shown in Fig. 1 further includes suitable means for obtaining a control voltage in accordance with the relative phase difference between correspondingly positioned pulses of the two clock trains. This means, referred to as the control voltage generator and shown by a block 33 in Fig. 1, is shown schematically in Fig. 2.

Figure 2:
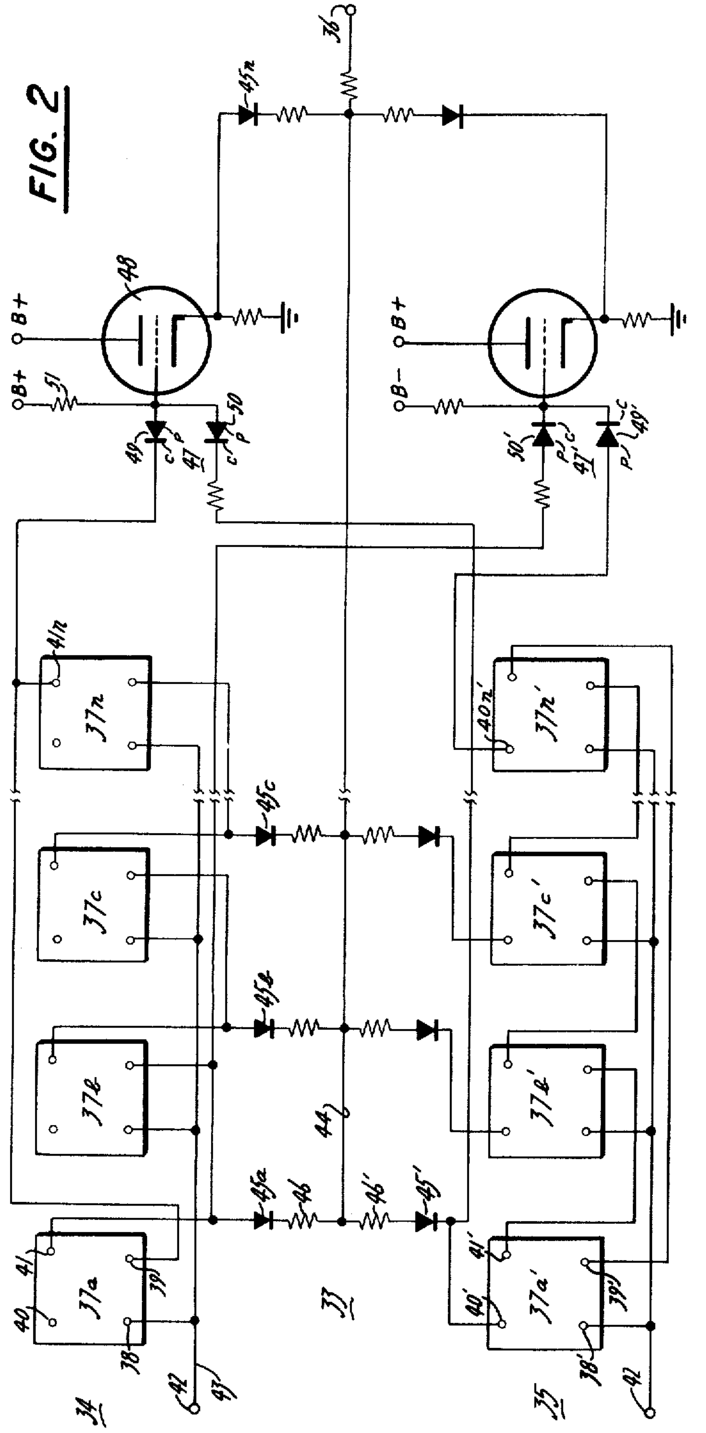
Fig. 2 is a schematic view of the control voltage generator shown in Fig. 1.

Referring to Fig. 2, the control voltage generator 33, as shown, comprises a pair of ring counters 34 and 35 which function to vary the potential at output terminal 36. The ring counters 34 and 35 are similar, so only one is described in detail. Ring counter 34 has a plurality of stages 37*a* through 37*n*, the exact number being determined by considerations which are discussed in detail further on in the specification. Each stage 37 of ring counter 34 comprises a suitable flip-flop circuit having a pair of input terminals 38 and 39 and a pair of output terminals 40 and 41. It is assumed that the flip-flop circuits shown follow the convention that negative-going pulses to input terminal 38 trigger the flip-flop if the output terminal 40 is low or, in other words, if the left side of the flip-flop (as shown in Fig. 1) is conducting. Input terminal 38 of each stage 37*a* through 37*n* is connected to terminal 42 on the input side of the generator 33 by means of line 43, and input terminal 39 of each stage is connected to output terminal 41 of the preceding stage so that a ring is formed.

The output terminal 41 of each stage of ring 34 except the last stage 37*n* is also connected to a common bus 44 through a diode 45 and a resistor 46, the diode 45 being poled so that it is conductive when terminal 41 is high and not conductive when terminal 41 is low. If stage 37*a* is chosen as the home position of ring 34, resistors 46 decrease in value for successive stages so that as the ring progresses from home position 37*a* the potential of common bus 44 tends to be increased in predetermined steps depending on the value of resistors 46.

Ring 35 is substantially identical with ring 34 with corresponding elements being designated by primed reference characters. However, output terminals 40′ are connected to common bus 44 through diodes 45′ and resistors 46′ rather than output terminals 41′. If stage 37*a*′ is chosen as the home position for ring 35, resistors 46′ likewise decrease in value for succeeding stages in accordance with the decrease of resistors 46 so that, as ring 35 progresses from home position 37*a*′, the potential of common bus 44 tends to decrease in steps corresponding to those caused by ring 34.

The output terminal 41*n* of the last stage 37*n* of ring 34 is connected to bus 44 through a logical "and" gate 47 and cathode follower 48. "And" gate 47 comprises diodes 49 and 50 having their cathodes "*c*" connected respectively to output terminal 41*n* of stage 37*n* and to output terminal 41*a*′ of stage 37*a*′ of ring 35. The plates "*p*" of diodes 49 and 50 are returned to B+ through plate resistor 51. Cathode follower 48 is connected between the output of "and" gate 47 and the plate of diode 45*n*. Stage 37*n*, when reached, tends to raise the voltage of bus 44 until home position on ring 35 is reached, at which time "and" gate 47 closes.

The last stage 37*n*′ of ring 35 is similarly arranged by "anding" its output terminal 40*n*′ with output terminal 41*a* in "and" gate 47′.

As shown in Fig. 1, the output terminal 52 of clock pulse generator 24 is connected to input terminal 42 of ring 34 and the output terminal 53 of clock pulse generator 25 is connected to input terminal 42′ of ring 35, both connections being made through suitable inverters 54 since it was previously assumed that rings 34 and 35 operate in response to negative-going pulses.

Figure 3:
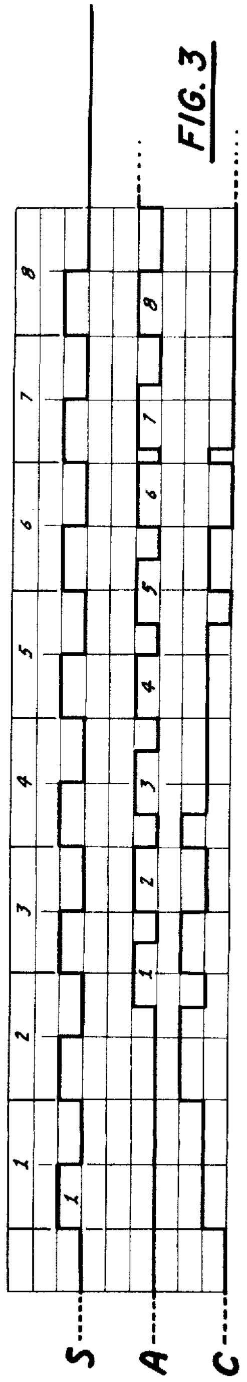
Fig. 3 illustrates two clock pulse trains and the control voltage obtained from the control voltage generator shown in Fig. 2.

Typical clock trains obtained from generators 24 and 25 are illustrated in Fig. 3, together with the wave of the control voltage obtained as a result of the relative phase difference between corresponding pulses of these trains. As shown in Fig. 3, the pulse train designated "S" corresponds to that obtained from the synchronous device 10, the pulse train designated "A" corresponds to that obtained from the asynchronous device 17, and that designated "C" corresponds to the control voltage obtained from the control voltage generator 33. The rings 34 and 35 are caused to advance in response to the pulses from clock pulse generators 24 and 25, respectively. For example, each pulse from generator 24 advances ring 34 one stage, tending to raise the potential of common bus 44. If correspondingly positioned pulses of the clock trains S and A are in phase, the rings progress in phase and the potential of the common bus 44 remains unchanged. However, if clock trains S and A are out of phase, a control voltage designated "C" in Fig. 3 is obtained. The control voltage "C" is employed to vary the nominal sweep speed of the suitable variable sweep generator shown diagrammatically in Fig. 1 by block 56.

Any suitable sweep generator may be employed in the system shown in Fig. 1. Preferably, the sweep generator should be of the type which has a substantially linear characteristic and whose sweep speed is variable from some predetermined rate in response to a control voltage. A sweep generator of the type shown schematically in Fig. 4 may be advantageously employed.

Figure 4:
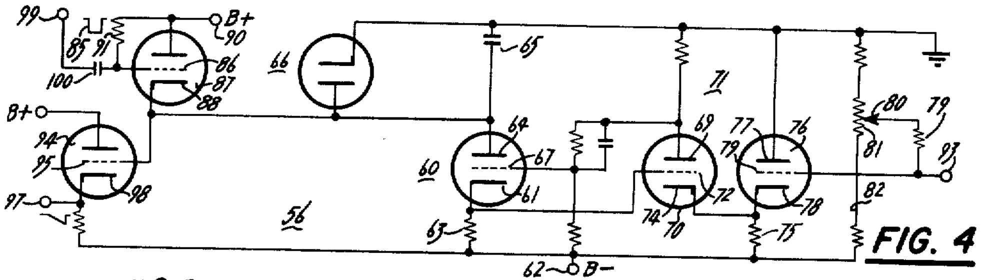
Fig. 4 is a schematic view of the variable sweep generator shown in Fig. 1.

The sweep generator 56 shown in Fig. 4 comprises a cathode follower 60 having its cathode 61 connected to B− terminal 62 through a resistor 63 and its plate 64 connected to a condenser 65 which is prevented from rising above ground by a diode clamp 66. Condenser 65 is charged negatively at a rate determined by the voltage across resistor 63 which is controlled by the bias voltage applied to grid 67 of cathode follower 60. Grid 67 is connected to plate 69 of triode 70 which forms one half of a differential amplifier 71. Plate 69, which is returned to ground through resistor 73, therefore, determines the bias voltage applied to grid 67. The grid 72 of triode 70 is, in turn, connected to the cathode 61 of cathode follower 60 and hence varies with the potential of cathode 61. Cathode 74 of triode 70 is connected to B— terminal 62 through cathode resistor 75.

The other half of the differential amplifier 71 comprises a triode 76 having its plate 77 connected directly to ground and its cathode 78 connected to B— terminal 62 through cathode resistor 75. The grid 79 of triode 78 is connected through a resistor to the movable contact member 80 of a potentiometer 81 positioned in voltage divider network 82. The setting of potentiometer 81, therefore, controls the cathode potential of triode 76 since triode 76 functions as a cathode follower. Further, since triodes 70 and 76 have their cathodes interconnected, the bias voltage between grid 72 and cathode 74 of triode 70 is also determined by potentiometer 81. The resulting plate voltage of triode 70 controls the grid bias of cathode follower 60 and hence the rate at which condenser 65 is charged negatively.

Charging of condenser 65 is initiated by a negative pulse 85 applied to the grid 86 of triode 87 to bias triode 87 to cutoff. Triode 87 has its cathode 88 connected to the plate 64 of cathode follower 60 and its plate 89 connected to B+ terminal 90. Grid 86 is also returned to B+ terminal 90 through a grid resistor 91. Applying a negative pulse 85 to grid 86 renders triode 87 non-conducting, allowing condenser 65 to be charged negatively at the nominal rate determined by potentiometer 81.

Variations from this nominal rate either to speed up or to slow down the sweep speed of generator 56 are obtained by applying the control voltage "C" (shown in Fig. 3) to terminal 93 of the sweep generator.

A cathode follower 94 has its grid 95 connected to the negatively charged plate of condenser 65 so that an output terminal 97 is provided at the cathode 98 of the cathode follower 94. The time for one sweep operation is determined by the length of the gating pulse 85 applied to input terminal 99 which connects to grid 86 through capacitor 100.

A number of various well known arrangements may be provided for obtaining gating pulse 85. One such arrangement 110 is shown simply and diagrammatically in Fig. 1 where an output terminal 111 of a flip-flop 112 is connected to terminal 99 of variable sweep generator 56. The input terminals 113 and 114 of the flip-flop 112 are connected respectively to a pair of transducers 116 and 117 through suitable amplifiers 118. One transducer, for example, transducer 116, is arranged to provide a pulse to terminal 113 to cause the output of terminal 111 to be trigged to its low state. Transducer 116 may therefore be termed the "start" transducer. Transducer 117, on the other hand, functions to trigger the flip-flop 112 back to its initial state, e.g., terminal 111 being high, and may therefore be termed the "stop" transducer. By placing start and stop bits on the synchronous record member at predetermined points with relation to the beginning and end of the track being read by transducer 12, the starting and stopping times for the sweep voltage wave produced by sweep generator 56 are determined. This voltage is employed to operate the asynchronous storage device 17.

As shown diagrammatically in Fig. 1, device 17 comprises a cathode ray tube 20 whose beam is deflected at a rate determined by the sweep rate of variable sweep generator 56, output terminal 97 of generator 56 being connected to the deflection coil 120 of cathode ray tube 20 through any suitable known deflection amplifier 121. As discussed previously, information is stored on the record element 122 in the form of marks or indicia which are translatable into pulsed electrical signals when scanned by the light spot from cathode ray tube 20 focused on photosensitive device 21, for example, by a suitable lens system 124. Photosensitive device 21 is preferably a photomultiplier tube 126 and an amplifier 127, but other suitable photosensitive devices known in the art may also be employed.

Figure 5:
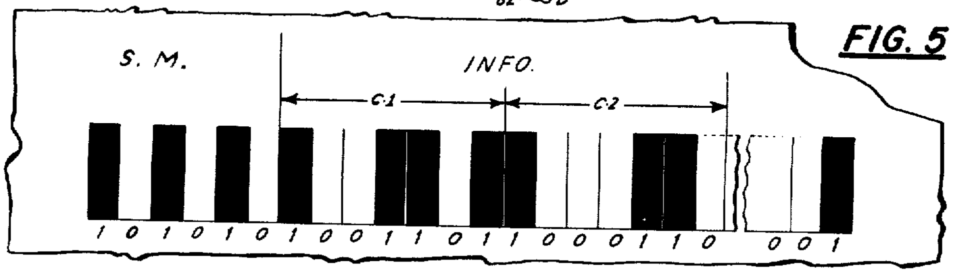
Fig. 5 is an enlarged partial view of a record element employed to store information in the asynchronous device.

A portion of the storage element 122 illustrating a line of marks representing coded information is shown enlarged in Fig. 5. One line of marks may contain, for example, 700 bit positions in an area .350 inch long and .003 inch high. At the beginning of each 700-bit line of information, a plurality of bit positions are employed for synchronizing marks SM. The marks are arranged so that at the start of each sweep cycle pulses, similar to the information pulses, are generated from these marks which cause the clock pulse geneator 25 to be rephased at each bit position. As a result, a clock pulse train similar to pulse train A, shown in Fig. 3, is generated by generator 25. A similar arrangement is also employed with the information stored by the synchronous device 10. At the beginning of each track on drum 11 a plurality of bit positions are used for synchronizing marks. As a result, a clock pulse train similar to pulse train S, shown in Fig. 3, is generated by generator 24.

For purposes of explanation, 8 bit positions are employed for generating synchronizing pulses in the system shown in Fig. 1. However, more or less bit positions may be employed depending on the time required for the asynchronous device 17, which is started from a rest position, to catch up to the synchronous device 10. In the present system the synchronous and asynchronous devices are in timed phased relationship with each other at the beginning of the ninth bit position so that information stored in their respective records may be processed in accordance with any suitable program without the use of an auxiliary buffer storage unit. The informational signals S and A will be maintatined in this relationship for one complete sweep cycle since any phase difference is immediately detected by control voltage generator 33.

Figures 6, 7:
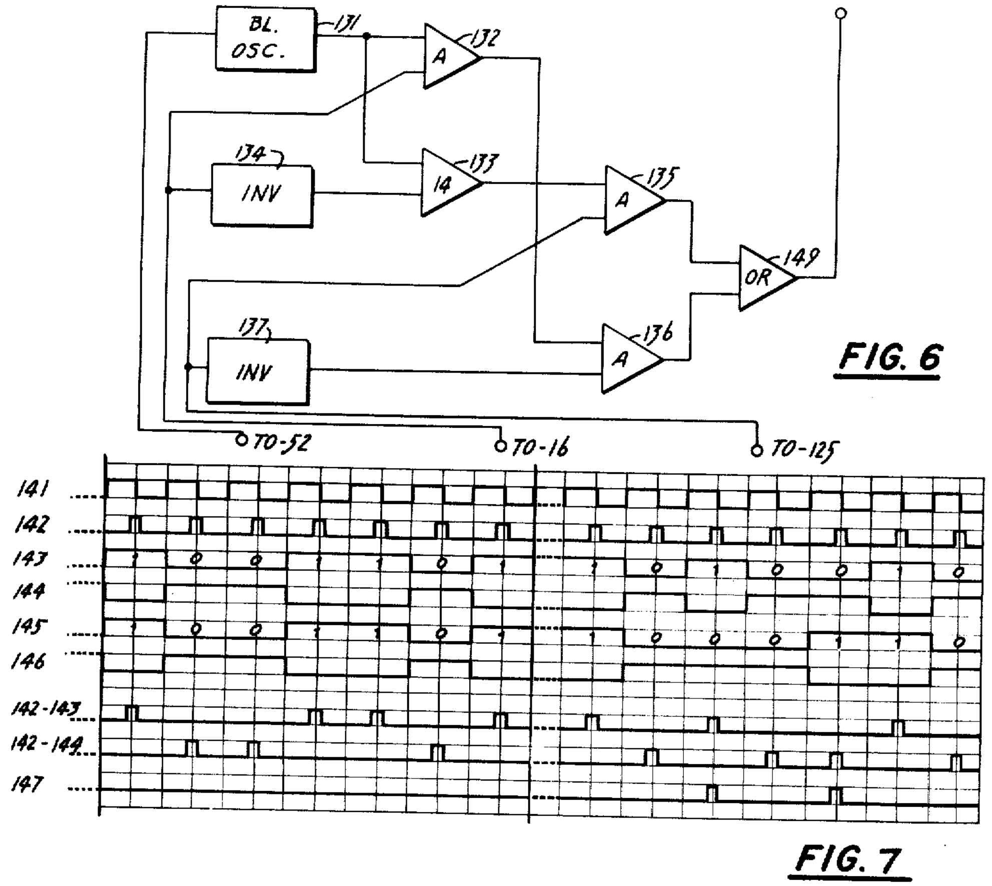
Fig. 6 is a schematic view of the coincidence circuit shown diagrammatically in Fig. 1.
Fig. 7 illustrates various voltage conditions which exist at different points in the circuit shown in Fig. 6.

By way of explanation, the system as shown in Fig. 1 is arranged to compare the informational signals from devices 10 and 17. The means for comparing the information stored in both devices is represented by block 130 in Fig. 1 and is shown diagrammatically in Fig. 6. As shown in Fig. 6, the means 130 functions to provide an output pulse in the event of non-coincidence of two bits being compared. The coincidence tester comprises a blocking oscillator 131 responsive to clock pulse signals from clock pulse generator 24 for providing relatively narrow strobe pulses at substantially the center of each bit time. The strobe pulses from blocking oscillator 131 are mixed with the informational signal from device 10 in an "and" gate 132 and with the complement of the informational signal from device 10 in "and" gate 133, the complementary signal being obtained by means of a suitable inverter 134. The output signal from "and" gate 133 is mixed with the informational signals from the asynchronous device 17 in "and" gate 135. If the bit positions being compared both contain a "1" bit, no output signal is obtained from "and" gate 135 since no strobe pulse is passed through "and" gate 133. However, if the bit from the asynchronous device contains a "1" and that from the synchronous device a "0" bit, a pulse would be obtained from the output of "and" gate 135.

The output of "and" gate 132 is mixed with the complement of the informational signal from the asynchronous device 17 in "and" gate 136, inverter 137 functioning to provide this complementary signal. "And" gate 136 provides an output signal when the informational signal from device 17 contains a "0" bit and the corresponding bit position of the informational signal from the synchronous device 10 contains a "1" bit.

Fig. 7 shows the waveform generated at various points in the circuit shown in Fig. 6 for both a coincidence and a non-coincidence condition between two 7-bit characters. In Fig. 7 reference character 141 denotes the clock-pulse signal from clock pulse generator 24 which is generated in response to the informational signal 143 obtained from synchronous device 10, 142 the signal from blocking oscillator 131, 144 the complement of the informational signal 143, 145 the informational signal from the asynchronous device 17 and 146 the complement of this informational signal. It is seen that the output signal 147 from "or" gate 149 is zero when coincidence occurs, and a pulse is provided when non-coincidence occurs.

It will be apparent that with only a slight modification information may also be readily transferred from device 17 to device 10 by connecting the output terminal 125 of device 17 to the input (represented by write amplifier 13W) of device 10.

While there have been shown and described and pointed out the fundamental novel features of the invention as applied to the preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A data processing system comprising in combination a synchronous storage device, means for reading information from said device at a predetermined rate to provide a first informational signal, means for generating a first clock pulse signal in timed, phased relation with said first informational signal, an asynchronous storage device including a plurality of movable records for information storage adapted to be positioned at a processing station and subject to positional errors thereat, means for reading information from one of said positioned records to provide a second informational signal, means for generating a second clock pulse signal in timed, phased relationship with said second informational signal, and means for controlling the read-out rate of said asynchronous device, said last means comprising a voltage responsive control device and a control voltage generator, said control voltage generator comprising a pair of ring counters each having an input terminal connected to a different one of said clock pulse generating means to provide a control voltage in accordance with the relative phase difference in the clock pulses applied to said rings, and means for utilizing said informational signals.

2. A data processing system comprising in combination an asynchronous information storage device including a plurality of movable records for information storage adapted to be positioned at a processing station and subject to positional errors thereas, each of said records including sequentially disposed coded indicia corresponding to stored information, nonrepetitive scanning means for translating said coded indicia into a first electrical signal in response to a single scan of said indicia, and means for controlling the scanning rate of said scanning means during said single scan in response to a control voltage; a synchronous information storage device including means for converting information stored in said synchronous device into a second electrical signal comprising a synchronizing portion followed by an information portion, means for generating first and second clock signals in timed phased relation with said first and second electrical signals respectively; means responsive to said clock signals for producing said control voltage during said single scan in accordance with the relative phase displacement between correspondingly positioned pulses of said clock signals whereby the rate at which information is converted from said asynchronous device is controlled so that the informational portions of said first and second electrical signals start in phase and are maintained in phase during the single scanning cycle; and means for comparing correspondingly positioned information bits of said first and second signals.

3. A data processing system comprising in combination a first unit having a synchronous information storage device including means for translating information stored in said device into a first pulsed electrical signal, a first portion of which comprises a plurality of synchronizing pulses and the remaining portion of which represents coded information, means for generating a first clock pulse train in timed phased relation with said first electrical signal, a second unit having an asynchronous nonrepetitive information storage device including a plurality of movable records for information storage adapted to be positioned at a processing station and subject to positional errors thereat, means for converting information stored on said records into a second pulsed electrical signal in response to a single scan of said information, said second signal including a first portion which comprises a plurality of synchronizing pulses and a remaining portion which represents coded information, means for controlling the operating rate of said converting means in response to a control voltage, means for generating a second clock pulse train in timed phased relationship with said second electrical signal, means for generating said control voltage in response to the phase difference between correspondingly positioned pulses of said first and second clock pulse trains to cause said remaining portions to be in phase, and means for utilizing said first and second electrical signals conjointly.

4. A data processing system comprising in combination a first data processing unit having a synchronous storage device including a magnetic transducer and a magnetizable record member disposed in recording relation with said transducer and movable at a substantially constant speed relative thereto, means for generating a first clock pulse signal at a predetermined rate determined by the speed of said record member, a second date processing unit having an asynchronous storage device comprising a record member having coded indicia representative of stored information translatable into electrical signals, said record element being movable with respect to said device to a processing station for scanning and subject to positional errors thereat, nonrepetitive scanning means for providing an informational signal at said predetermined rate in response to a single scan of the indicia, means for generating a second clock pulse signal in timed phased relation with said information signal, means for generating a control voltage in response to the phase difference between correspondingly positioned pulses of said first and second clock pulse signals, means to vary said predetermined rate in response to said control voltage, and means for supplying said magnetic transducer with said information signal to cause the information stored by said record element to be transferred to said member of said synchronous device under the control of said first clock pulse generating means.

5. A data processing system comprising in combination a first data processing unit having a synchronous storage device including a magnetic transducer and a magnetic record member movable relative to said transducer at a substantially constant speed and having magnetic bits thereon representing stored information, means including said transducer for translating said bits into a first information signal, means for generating clock pulses at a predetermined frequency in timed phased relation with said information signal, a second data processing unit having an asynchronous storage device including a record element having coded indicia representing stored information translatable into a second information signal at a predetermined rate, said record element being movable with respect to said device to a processing station for scanning and subject to positional errors thereat, means for translating said indicia into said second informational signal at said rate, means for controlling said rate in response to a control voltage, means for generating a second clock pulse signal in timed phased relation with said second information signal, means responsive to the difference in phase between correspondingly positioned pulses of said first and second clock pulse trains for generating said control voltage, and means for supplying said control voltage to said control means to control the rate at which said indicia are translated into said second informational signal whereby said informational signals are in phase after a predetermined number of clock pulses, and means for utilizing said in phase informational signals.

6. A data processing system comprising in combination a first unit having a magnetic type storage device including a record member movable at a substantially constant speed and having thereon magnetized areas representing coded information preceded by other areas representing control information, means for converting said areas into a first continuous signal, means for generating a first clock train under the control of said first signal and in timed phased relationship therewith, a second unit having a storage device including a record element containing indicia representing coded information preceded by other indicia representing control information, said record element being movable with respect to said second unit storage device to a processing station for scanning and subject to positional errors thereat, means for varying said rate in response to a control voltage, scanning means operable from a predetermined starting position for converting said indicia into a second continuous signal at a predetermined rate, means under control of said first unit for initiating operation of said scanning means from said predetermined starting position, means responsive to said second signal for generating a second clock train in timed phased relation with said second continuous signal, means for producing a voltage in response to the relative phase difference between correspondingly positioned pulses of said clock trains to control said scanning means to cause said continuous signals to be properly phased.

7. A data processing system comprising in combination a first data processing unit including a magnetic type storage device, means for reading information from said storage device to produce a first information signal, a first clock pulse generator having an input terminal connected to said reading means, a second data processing unit including a photoelectric type storage device comprising a record element movable to a scanning station and subject to positional errors thereat, a beam generating device operable to scan said indicia at a predetermined rate, and photosensitive means responsive to the scanning of said indicia by said beam to produce a second informational signal, means under control of said first unit for initiating operation of said beam generating device, means for varying said rate in response to a control voltage, a second clock pulse generator having an input terminal connected to said photosensitive means, and means for obtaining said control voltage in accordance with the phase difference between correspondingly positioned pulses generated by said first and second clock pulse generators whereby said first and second informational signals are in synchronism.

References Cited in the file of this patent

UNITED STATES PATENTS

| | | |
|---|---|---|
| 2,606,288 | Chatterton et al. | Aug. 5, 1952 |
| 2,652,554 | Williams | Sept. 15, 1953 |
| 2,702,380 | Brustman | Feb. 15, 1955 |
| 2,764,634 | Brooks et al. | Sept. 25, 1956 |
| 2,774,056 | Stafford et al. | Dec. 11, 1956 |
| 2,797,378 | Johnson | June 25, 1957 |
| 2,800,277 | Williams | July 23, 1957 |

FOREIGN PATENTS

| | | |
|---|---|---|
| 743,058 | Great Britain | Jan. 11, 1956 |